United States Patent
Wenzler

(10) Patent No.: US 7,051,703 B2
(45) Date of Patent: May 30, 2006

(54) METHOD, COMPUTER PROGRAM, AND CONTROL AND/OR REGULATING DEVICE FOR OPERATING AN INTERNAL COMBUSTION ENGINE AND CORRESPONDING INTERNAL COMBUSTION ENGINE

(75) Inventor: Thomas Wenzler, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 10/474,695

(22) PCT Filed: Dec. 18, 2001

(86) PCT No.: PCT/DE01/04740

§ 371 (c)(1),
(2), (4) Date: Oct. 14, 2003

(87) PCT Pub. No.: WO02/084096

PCT Pub. Date: Oct. 24, 2002

(65) Prior Publication Data

US 2004/0112334 A1    Jun. 17, 2004

(30) Foreign Application Priority Data

Apr. 12, 2001    (DE)    ................. 101 18 264

(51) Int. Cl.
*F02D 75/02*    (2006.01)
(52) U.S. Cl. ..................................... 123/319; 123/396
(58) Field of Classification Search ................ 123/294, 123/319, 330, 332, 434, 445, 480, 457, 472, 123/478, 396
See application file for complete search history.

(56) References Cited

U.S. PATENT DOCUMENTS 5,394,331 A    2/1995    Dudek et al.
6,047,681 A    4/2000    Scherer et al.

FOREIGN PATENT DOCUMENTS

DE    197 37 375    3/1998
EP    1077321    2/2001

*Primary Examiner*—Bibhu Mohanty
(74) *Attorney, Agent, or Firm*—Walter Ottesen

(57) ABSTRACT

In a method for operating an internal combustion engine, the fuel is supplied via at least one injection valve. The injection fuel quantity is influenced by the injection duration. In order that the internal combustion engine be operated optimally with respect to emission and comfort, it is suggested that it is predicted whether a requested injection duration of the injection valve become greater that a maximum possible injection duration. If the prediction yields that a case is imminent, at least a quantity, which is decisive for the combustion, is on influence that the torque (M) is gently reduce.

21 Claims, 4 Drawing Sheets

METHOD, COMPUTER PROGRAM, AND CONTROL AND/OR REGULATING DEVICE FOR OPERATING AN INTERNAL COMBUSTION ENGINE AND CORRESPONDING INTERNAL COMBUSTION ENGINE

FIELD OF THE INVENTION

The present invention relates to a method for operating an internal combustion engine wherein the fuel is injected via at least one injection valve and the injected fuel quantity is influenced by the injection duration.

BACKGROUND OF THE INVENTION

A method of this kind is known from the marketplace. In the method, fuel is injected into an intake channel via an injection valve. The injected fuel forms a fog in the intake channel and is transported into a combustion chamber of the engine. The fuel is supplied to the injection valve by a fuel feed line which is essentially under constant pressure. If, for example, a high load is requested by the user, then the injection valve is so driven that it remains open relatively long. In this way, a larger quantity of fuel gets into the intake manifold.

The maximum possible injection duration of the injection valve is, however, limited. In intake manifold injections, the injection valve, in the extreme case, can be simply opened continuously. However, it is more advantageous to have a discrete opening operation because injection into an open inlet valve should not occur. For an open inlet valve, the injection valve should therefore be closed as much as possible. The state of a continuously open injection valve is also characterized as a "Dauerstrich". The fuel is directly injected into the combustion chamber with gasoline-direct injection as likewise known from the marketplace. Here, the maximum possible injection duration equals the duration of the intake stroke plus the compression stroke as may be required.

If the user of the engine requests a high load, that is, for example, a high torque at a possibly high rpm, then it can happen that the requested injection duration of the injection valve is greater than the maximum possible injection duration. Since the maximum possible injection duration is, however, limited depending on the engine, a fuel quantity is injected corresponding to the maximum possible injection duration notwithstanding this higher requested injection duration. At the same time, a large air charge is supplied to the combustion chamber which corresponds to the requested high torque so that the mixture, which arrives in the combustion chamber, is overall too lean. This leads, on the one hand, to a non-optimal emission performance and, on the other hand, to an increased temperature of the engine and of the exhaust gas.

A sudden drop of the rpm and therefore a sudden slowing of the rpm increase can occur, when, for increasing rpm, the actual injection duration is limited by the maximum possible injection duration. This is realized, for example, in a motor vehicle as an acceleration jolt by the passengers or by the driver. In this way, the comfort with the use of the engine is limited.

SUMMARY OF THE INVENTION

The present invention therefore has the task to so improve a method of the kind mentioned initially herein that the comfort in the use of internal combustion engines operated in this manner is limited as little as possible and so that, simultaneously, the engine has an optimal emission performance.

This task is solved with a method of the kind mentioned initially herein in that it is predicted as to whether a requested injection duration of the injection valve becomes greater than a maximum possible injection duration and that, when the prediction yields that such a case threatens, at least one quantity, which is decisive for the combustion, is so influenced that the torque is gently reduced.

In the method of the invention, it is therefore not waited until the actual injection duration is forceably limited by the maximum possible injection duration, rather, there is an intervention already before reaching such a state. For this purpose, it is necessary that a prediction take place as to whether such a state can occur with high probability wherein the requested injection duration of the injection valve is greater than the maximum possible injection duration. If the prediction yields that such a state will occur in the near future if no corresponding measures are taken, then, in accordance with the method of the invention, reaction is immediate, namely: a measure is initiated which contributes to the condition that the requested injection duration of the injection valve does not exceed the maximum possible injection duration.

This measure is as simple as it is effective: the measure comprises that the torque, which is generated by the engine, is gently reduced. Under "gentle" reduction, it is understood that the reduction of the torque is not abrupt; rather, the reduction takes place continuously and the rate of change is so small that this rate of change is not perceived as being unpleasant, for example, by the occupants of a motor vehicle. The reduction of the torque can take place so that the actual injection duration remains so far below the maximum possible injection duration that an enrichment of the air/fuel mixture is still possible which is required, for example, for reasons of emissions or for reducing the exhaust-gas temperature.

Here, it is noted that the improvement of the emission performance and comfort performance of the internal combustion engine operated in accordance with the invention by the method of the invention is most economical and is easily possible because no additional components are required.

In a first embodiment, the reduction rate of the torque is less than a limit value. The quantity by which the torque can be reduced per unit of time because of this measure is therefore limited to a maximum value. With this limiting of the rate of change of torque, it is achieved that the comfort in the use of the engine, which is operated in accordance with the method of the invention, is optimal. In an internal combustion engine, which is built into a motor vehicle, the rate of change of torque can, for example, be so limited that the change of the acceleration of the vehicle, which takes place because of the measure in accordance with the invention, is not perceived as being disturbing by the driver and his passengers.

In a further embodiment, the limit value for the change of the torque per time is determined by a realization threshold of a user. According to the invention, it was determined that, for example, in a motor vehicle, changes in acceleration can only be realized by the occupants starting at a specific intensity. This is taken into account by the selection of the limit value in accordance with the invention. In the extreme case, it can be reached that the reduction of the torque is not at all realized by the user of the engine because of the influencing of the quantity which is decisive for the combustion.

It is also possible that the prediction takes place from a comparison of the difference between the maximum possible injection duration and the requested injection duration to a limit value and a comparison of the rate of change of this difference to a limit value. This type of prediction of an imminent exceeding of the maximum possible injection duration of the injection valve is especially easy to realize. This prediction is based on the assumption that exceeding the maximum possible injection duration can only be expected when the requested injection duration of the injection valve has come close to a specific value of the maximum possible injection duration and when this approachment takes place with a specific minimum speed.

According to an especially preferred embodiment, the limit value for the rate of change of the difference between maximum possible injection duration and requested injection duration is dependent upon the magnitude of the difference. In this way, it can be considered that, on the one hand, for a very high rate of change, even for a still relatively large distance of the requested injection duration from the maximum possible injection duration, an exceeding of the maximum possible injection duration is imminent, whereas, on the other hand, such a condition can be imminent with a reduced distance between maximum possible injection duration and requested injection duration also at a lower rate of change.

In another embodiment of the method of the invention, it is suggested that the prediction take place via a monitoring method, especially, a Luenberger monitoring method or a Kalman-Bucy-Filter.

An especially relevant quantity decisive for the combustion is the air charge disposed in the combustion chamber. For this reason, it is also suggested in accordance with the invention that the influencing includes the change of an air charge of a combustion chamber in the case that the prediction yields that an exceeding of the maximum possible injection duration is imminent. This can take place especially simply via an adjustment of the angle of a throttle flap.

It is, however, also possible that the influence includes the reduction of a charging pressure and/or an intake manifold pressure. The reduction of the charging pressure applies, of course, only to such internal combustion engines whose induction air is precompressed. Such a reduction of the charging pressure is, for example, especially easy to realize via a so-called waste-gate.

Alternatively, or in addition hereto, the influencing can also include an increase of the fuel pressure.

In lieu of directly influencing the air charge of the combustion chamber, the influencing can also include a reduction of the desired torque. In this case, not one component of the air/fuel mixture is specifically changed; rather, a much earlier intervention in the control path takes place. This affords the advantage that the control of the mixture itself remains untouched.

It is especially preferred that the influencing takes place via a characteristic line whose input quantity is the difference between requested injection duration and maximum possible injection duration. In this way, the extent of the influencing can be determined in a simple manner in dependence upon the instantaneous operating state of the engine.

Alternatively to the above, it is also possible that the influencing takes place by means of a controller, especially a PD-controller or a PID-controller, whose control quantity is the difference between requested injection duration and maximum possible injection duration. With a controller of this kind, the influence can, on the one hand, be very accurate and, on the other hand, take place most gently.

Here, it is especially preferred when the rate of change of the torque is used as the additional control quantity. This once again augments the comfort with the operation of the engine in accordance with the invention. This is so because, with this measure, the quantity, which is decisive for the combustion, can be just so influenced that the rate of change can be maintained in a region which is only slightly or not at all realizable by the user.

The invention relates also to a computer program which is suitable for executing the above method when it is run on a computer. Here, it is especially preferred when the computer program is stored in a memory, especially, in a flash memory.

The invention further relates to a control apparatus (open loop and/or closed loop) for operating an internal combustion engine having at least one injection valve for supplying fuel and which apparatus outputs a desired value for the injection duration of the injection valve.

In order to be able to ensure an emission optimal operation and a comfort optimal operation in all operating situations of the engine, it is suggested in accordance with the invention that the control apparatus (open loop and/or closed loop) include means which predict whether a requested injection duration of the injection valve is greater than a maximum possible injection duration; and, that the apparatus includes means which, when the prediction yields that such a case is imminent, at least one quantity, which is decisive for the combustion, is so influenced that the torque reduces gently.

Such a control apparatus (open loop and/or closed loop) is especially preferred when the apparatus is provided with a computer program of the type mentioned above.

Finally, the invention relates to an internal combustion engine having at least one injection valve for supplying the fuel. In order to ensure an emission-optimal and comfort-optimal operation in such an internal combustion engine, it is suggested that the engine includes a control apparatus (open loop and/or closed loop) of the above-mentioned type.

BRIEF DESCRIPTION OF THE DRAWING

The invention will now be described with reference to the drawings wherein.

In the following, embodiments of the invention are explained in detail with reference to the accompanying drawing. In the drawing.

DESCRIPTION OF THE PREFERRED EMBODIMENTS OF THE INVENTION

Figure 1:
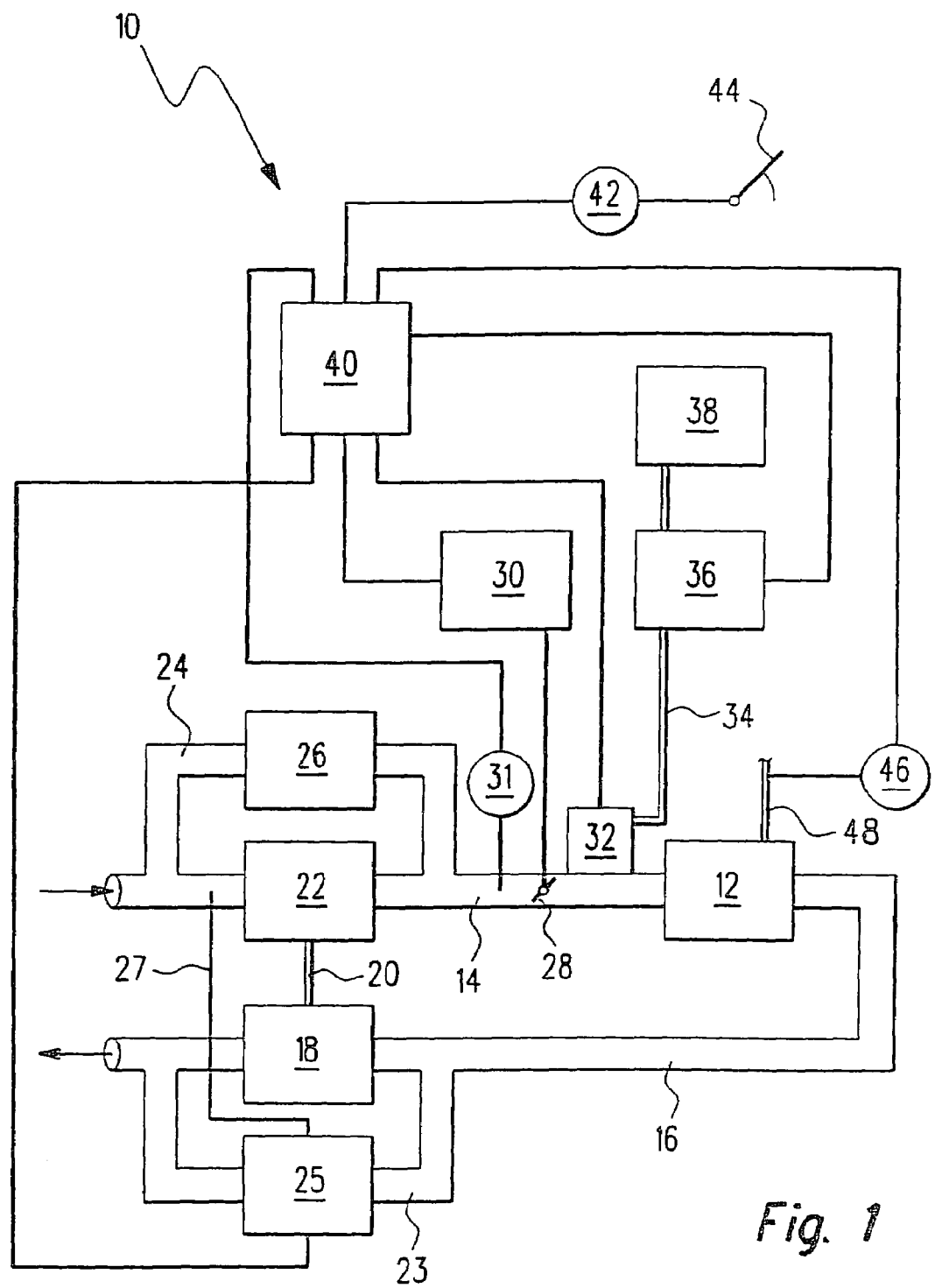
FIG. 1 shows a block circuit diagram of an internal combustion engine.

In FIG. 1, an internal combustion engine is identified by reference numeral 10. The engine includes a combustion chamber 12 which is connected to an intake manifold 14 via an inlet valve (not shown). The combustion chamber 12 is furthermore connected to an exhaust-gas pipe 16 via an outlet valve (not shown).

A turbine 18 is mounted in the exhaust-gas pipe 16 and drives a compressor 22 via a shaft 20. A waste-gate line 23 bypasses the turbine 18 and a waste-gate 25 is mounted in this line. The waste-gate is driven via the pressure, which is present in the intake manifold 14, in a manner which is not of further interest here and this is indicated by line 27. The compressor 22, in turn, is mounted in the intake manifold 14. An air recirculation line 24 branches away from the intake manifold 14 upstream of the compressor 22. This air recirculation line opens again downstream of the compressor 22 in the intake manifold 14. An air valve 26 is mounted in the recirculation line 24.

A throttle flap 28 is provided in the intake manifold 14 and has an angular position set by an actuating motor 30. A hot-film air-mass sensor (HFM-sensor) 31 is provided upstream of the throttle flap 28 and this sensor measures the air mass flowing through the intake manifold 14. Also, an injection valve 32 is mounted between the throttle flap 28 and the combustion chamber 12 and fuel can be injected therewith into the intake manifold 14. The injection valve 32 is supplied via a fuel line 34 and a fuel pump and control unit 36 from a tank 38.

A control apparatus (open loop and/or closed loop) 40 is connected at the input end to the HFM-sensor 31 and a position transducer 42 of an accelerator pedal 44. In addition, the control apparatus 40 receives signals from an rpm sensor 46 which taps the rpm of a crankshaft 48. At the output end, the control apparatus 40 is connected to the following: the waste-gate 25 in the waste-gate line 23; the actuating motor 30 of the throttle flap 28; the injection valve 32; and, the fuel pump and pressure control unit 36.

The internal combustion engine 10 shown in FIG. 1 is built into a motor vehicle (not shown in the drawing) and drives this motor vehicle.

In the normal case, the internal combustion engine 10 is operated as follows.

Air is drawn via the intake manifold 14 via suction during an intake stroke. A load, which is requested by the user, is defined by the control apparatus 40 in dependence upon the position of the accelerator pedal 44 determined by the position transducer 42 and the positioning motor 30 of the throttle flap 28 is correspondingly driven in an air-guided system. If necessary, an intervention can be had also in the control of the waste-gate 25 and the charging pressure adjusted thereby.

The injection valve 32 is so driven by the control apparatus 40 in dependence upon the air mass determined by the HFM-sensor 31 that a wanted mixture composition is obtained. Accordingly, a specific quantity of fuel is injected into the intake manifold 14. The fuel quantity is fixed by the open duration of the injection valve 32. The exhaust gas, which exits from the combustion chamber 12, drives the turbine 18 which, in turn, drives the compressor 22 in specific operating states of the engine 10 via the shaft 20. The compressor 22 precompresses the air in the exhaust-gas pipe 16.

It is noted that, as an alternative, the determination of the air mass flow can also take place via a pressure sensor in the intake manifold.

Under specific conditions, it can be necessary to reduce the pressure in the intake manifold 14. This is brought about in that the waste-gate 25 is so driven that it opens. In this case, exhaust gas can flow past the turbine 18 so that the turbine and therefore also the compressor 22 are driven with lesser intensity.

As already explained above, the injected fuel quantity is determined by the duration of the injection via the injection valve 32. The higher the rpm of the engine 10, the shorter is the time which is available for the injection of the fuel. Especially at high rpm and a high power request (high driver wanted torque) by the user of the engine 10, a situation can become imminent wherein the fuel quantity, which is required to achieve this power, can not be injected because too little time is available for the injection of the fuel. In such a case, the requested injection duration of the injection valve 32 would be greater than a maximum possible injection duration.

A situation of this kind can, for example, occur when the engine 10 is already operated at continuously open injection valve 32 but, to protect the turbine 18 from overheating, enrichment of the mixture should take place which, in turn, leads to a reduction of the exhaust-gas temperatures in the exhaust-gas pipe 16. In this case, a situation is imminent in which the requested injection duration of the injection valve 32 exceeds the maximum possible injection duration.

Figure 2:
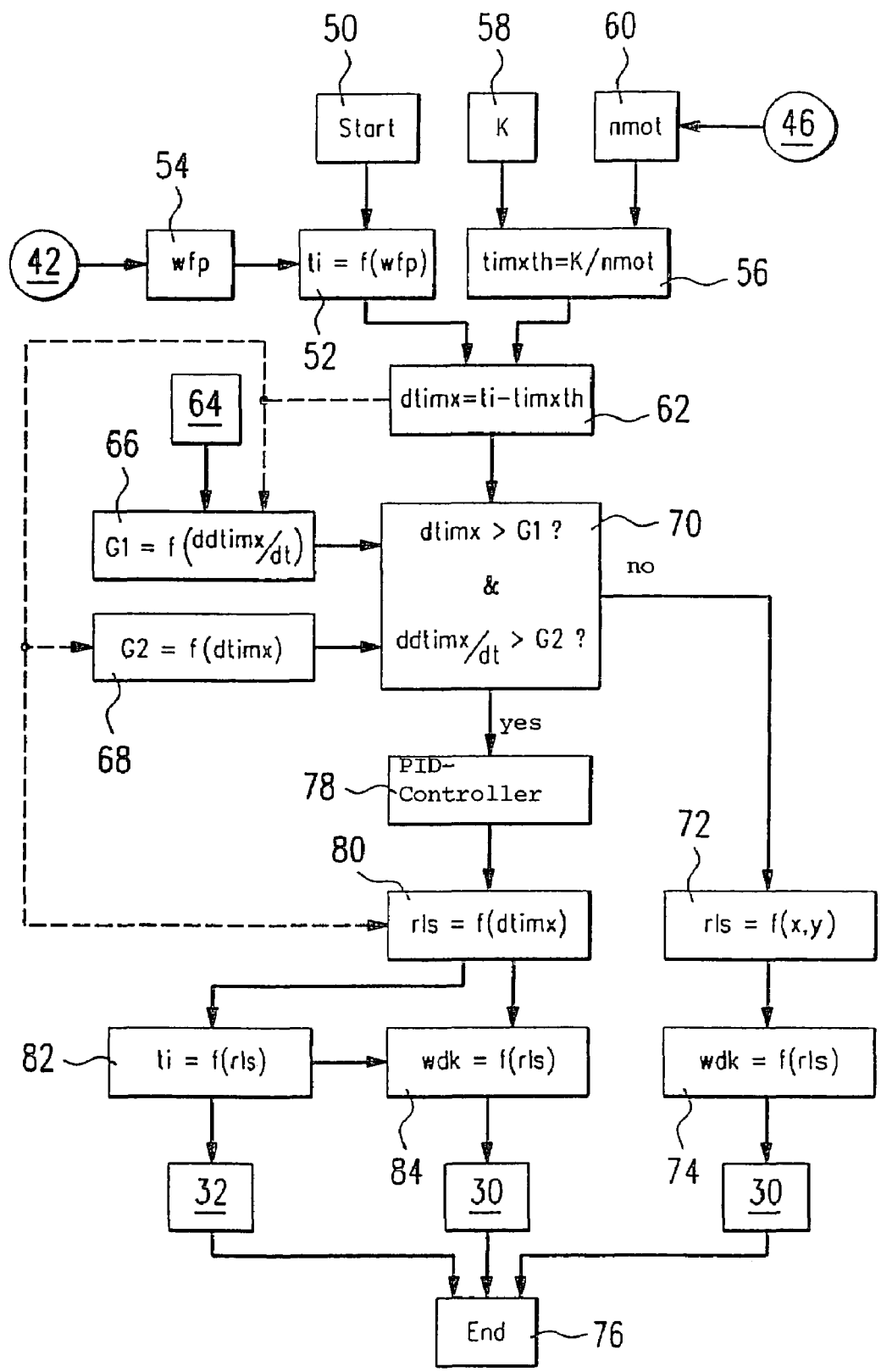
FIG. 2 shows a flowchart of a method for operating the internal combustion engine of FIG. 1.
Figure 3:
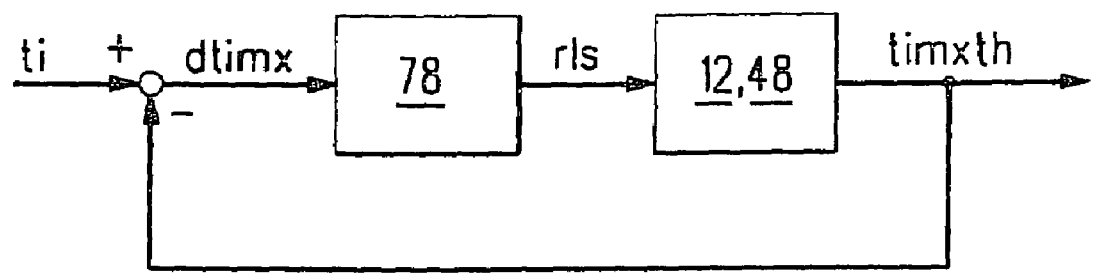
FIG. 3 shows a flowchart of a section of the method of FIG. 2.

In order to operate the internal combustion engine 10 also in the above-mentioned cases so as to be optimal with respect to emissions and comfort, one correspondingly proceeds with the method shown in FIGS. 2 and 3. The method is stored as a computer program in the control apparatus 40.

After a start block 50, a determination is first made in block 52 as to how long the injection duration ti should be if the power is to be obtained which corresponds to the position wfp (block 54) of the accelerator pedal 44 determined by the position transducer 42. This determination can take place via the "detour" of the air charge determined via the HFM-sensor 31. For this purpose, a desired torque is first determined from the position of the accelerator pedal 44. A necessary air charge is then determined from this desired torque. The fuel mass or the injection duration, which results therefrom, is derived from the air charge and the desired mixture composition. The exhaust-gas temperature can be influenced via the desired mixture composition.

In parallel thereto, the quotient timxth is formed in a block 56 from a factor K (block 58) and the rpm nmot (block 60) of the crankshaft 48. The rpm nmot is determined by the rpm sensor 46. The factor K is a motor-specific quantity which results from the maximum possible injection duration at maximum rpm. Finally, the factor K corresponds to the maximum crankshaft angle which can be passed through during an injection. The factor K contains also fixed conversions which result from the units. The quotient timxth corresponds to the maximum possible injection duration of the injection valve 32 at the instantaneous rpm nmot. In the block 62, the difference dtimx between the requested injection duration ti and the maximum injection duration possible timxth is formed.

With the signals from the timer 64, the change of the difference between requested injection duration and maximum possible injection duration dtimx per time (that is, the rate of change ddtimx/dt) is determined in block 66 and a limit value G1 for the difference dtimx is formed therefrom. Furthermore, a second limit value G2 for the rate of change ddtimx/dt is formed in block 68 from the difference dtimx between the requested injection duration and the maximum possible injection duration. The considerations, on which these limit value formations are based, are set forth in detail hereinafter.

Both limit values are fed into block 70 wherein two conditions are checked. On the one hand, a check is made as to whether the difference dtimx between requested injection duration and maximum possible injection duration lies in magnitude above the limit value G1 determined in block 66. Furthermore, a check is made in block 70 as to whether the speed ddtimx/dt, with which the difference between the requested and maximum possible injection duration changes, lies, in magnitude, above the limit value G2 determined in block 68.

If both conditions are satisfied, that is, the answer in block 70 is "yes", then this means that exceeding the maximum possible duration timxth by the requested injection duration ti is predicted. In block 70, it is therefore determined whether, without corresponding countermeasures, a situation would occur in the near future wherein the requested fuel quantity would no longer be injected because of the limiting by the maximum possible injection duration timxth.

The prediction, which is carried out in block 70, is based on the following considerations.

The problem that the requested injection duration exceeds the maximum possible injection duration is dependent essentially on two factors, namely: on the one hand, the distance of the instantaneous requested injection duration from the instantaneous maximum possible injection duration and, on the other hand, the speed with which the instantaneous requested injection duration moves toward the instantaneous maximum possible injection duration.

If the distance between the requested injection duration and the maximum possible injection duration is relatively large, then a relatively high speed can be permitted without it being necessary to assume that the requested injection duration exceeds the maximum possible injection duration. If, in contrast, the distance between the requested injection duration and the maximum possible injection duration is relatively small, then also a relatively low speed (with which the requested injection duration moves toward the maximum possible injection duration) can lead to the maximum possible injection duration being exceeded by the requested injection duration.

This is considered by the determination of the variable limit values G1 and G2 in blocks 66 and 68. For a low rate of change, a higher, that is, less sharp limit value is determined than for a correspondingly high speed. In block 68, a correspondingly greater and therefore also less sharp limit value is determined for a large distance dtimx than for a small distance. The determination of the limit values G1 and G2 in the blocks 66 and 68 can, for example, take place with the aid of characteristic lines.

If it is determined in block 70 that exceeding the maximum possible injection duration by the requested injection duration is not imminent, then the answer is "no" and the air charge in the combustion chamber 12 is determined in the usual manner in dependence upon parameters x, y, et cetera in block 72. The parameters (x, y) can, for example, be the requested torque, an ambient pressure, et cetera. The determination of the air charge preferably takes place via one or several characteristic fields. From the determined air charge rls, an angle wdk for the throttle flap 28 is determined in block 74 and the positioning motor 30 is correspondingly driven. The method ends in end block 76.

If, however, the prediction in block 70 yields that the requested injection duration threatens to exceed the maximum possible injection duration, then the answer in block 70 is "yes" and an adaptation of the air charge rls (see FIG. 3) takes place in a PID-controller in block 78. In block 78, the PID-controller receives, as a control quantity, the difference dtimx between the requested injection duration ti and the maximum possible injection duration timxth. An air charge rls results in block 80 as actuating quantity. The actuating quantity can be a desired torque from which the desired air charge is computed. From the desired value rls for the air charge, a corresponding throttle flap angle wdk is determined in block 84 and the positioning motor 30 is correspondingly driven. The corresponding actual air charge is detected by HFM-sensor 31 and a new requested injection duration ti corresponding to the wanted mixture composition is, for example, determined from a characteristic field in block 82.

It is noted that, in FIG. 2, a direct relationship between the air charge rls and the injection duration dtimx is given simplified in block 80 for reasons of illustration. Actually, however, the control is an operator on dtimx. In the special case of a PID-controller, the relationship is then:

$$rls = f\left(\frac{d(dtimx)}{dt}, \int dtimx \cdot dt, dtimx\right)$$

The drive of the injection valves 32 takes place in correspondence to the requested injection duration ti determined in block 82. The control path includes, for example, the combustion chamber 12 of the internal combustion engine 10 as well as the crankshaft 48. A specific rpm nmot results over this control path from the throttle flap angle wdk and the injection duration ti which rpm nmot, in turn, leads to a specific maximum possible injection duration timxth. This injection duration, in turn, leads back to the formation of the control quantity dtimx in the sense of a closed control path.

The operation of the method shown in FIGS. 2 and 3 will now be explained with reference to FIGS. 4 to 7.

In the following, a case is assumed wherein the user of the internal combustion engine 10 actuates the accelerator pedal so that the actuation is constant and the motor vehicle, which is driven by the engine 10, accelerates uniformly at a uniformly increasing rpm nmot of the engine 10. The maximum possible injection duration timxth is the reciprocal of the rpm. For the at first linear increase of the rpm nmot shown in FIG. 4, there results in FIG. 5 a hyperbolic course for the maximum possible injection duration timxth (shown dotted). The requested injection duration ti is, in contrast, at first constant as seen in FIG. 5. If no measures are initiated, the difference dtimx between requested injection duration ti and maximum possible injection duration timxth becomes continuously less until it reaches zero at the time point t2.

Starting at this time point t2, the injection duration would be limited by the maximum possible injection duration timxth. Correspondingly, the requested injection duration ti could track the maximum possible injection duration timxth which, however, is expressed by a kink in the broken-line curve ti at time point t2. If a specific mixture composition is to be maintained, then the desired value rls for the air charge must be correspondingly limited to a maximum air charge rlsmxth (see FIG. 6). This, too, is expressed by a kink in the broken-line curve for the desired value rls for the air charge in the combustion chamber 12 in FIG. 6 at time point t2.

The torque M, which is outputted by the internal combustion engine 10, and, incidentally, also the acceleration force F, which acts on the vehicle and its occupants, can be seen as approximately proportional to the air charge. For this reason, the torque M and the corresponding acceleration force F both have such a kink. Each is shown by a broken line and, for reasons of illustration, no inherent curves are plotted for the torque M and the acceleration force F in FIG. 6 but both correspond qualitatively to the curve for the desired air charge rls shown in FIG. 6.

Figure 7:
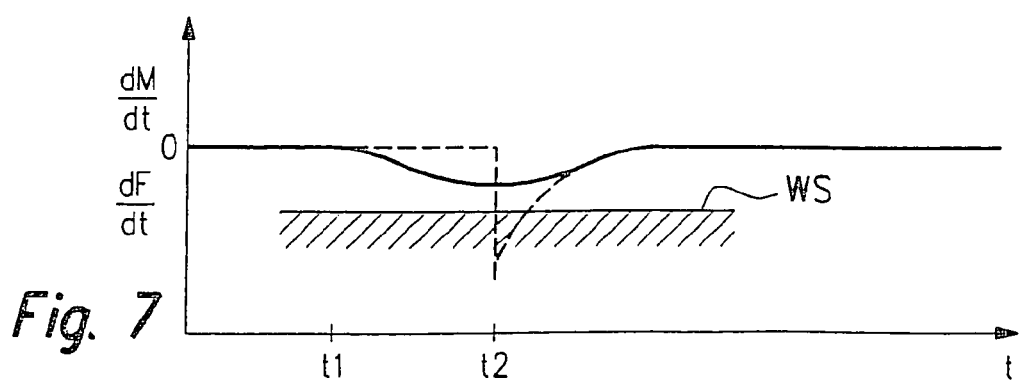

The change of the torque M as a function of time, that is, the rate of change dM/dt as well as the change of the acceleration F over time (that is, its rate of change dF/dt) are plotted in FIG. 7. Here, too, that case is shown by a broken line which occurs when the requested injection duration ti is abruptly limited at time point t2 by the maximum possible injection duration timxth and the air charge.

The previously constant acceleration force F becomes likewise less because of the torque M which becomes less. For this reason, the acceleration jolt results, which is shown in FIG. 7 and which exceeds the realization threshold characterized in FIG. 7 by WS, and is therefore clearly perceived by the occupants of the motor vehicle. If the comfort for the occupants is to be improved, the speed dF/dt, with which the acceleration force F changes, must be limited to an amount which cannot be perceived by the occupants of the motor vehicle. The speed dF/dt must therefore remain above the perception threshold WS. This is achieved with the method described in FIGS. 2 and 3.

As already explained above, a prediction is made at time point t1 that, without corresponding countermeasures, the requested injection duration ti will at time point t2 exceed the maximum possible injection duration timxth. For this reason, the torque M in the engine 10 is already at time point t1 somewhat reduced by the PID-controller in block 78 in FIGS. 2 and 3 in that the desired value rls for the air charge is reduced in block 80 in FIGS. 2 and 3 and the injection duration ti is, in turn, reduced in block 82 in dependence thereon.

Figure 4:
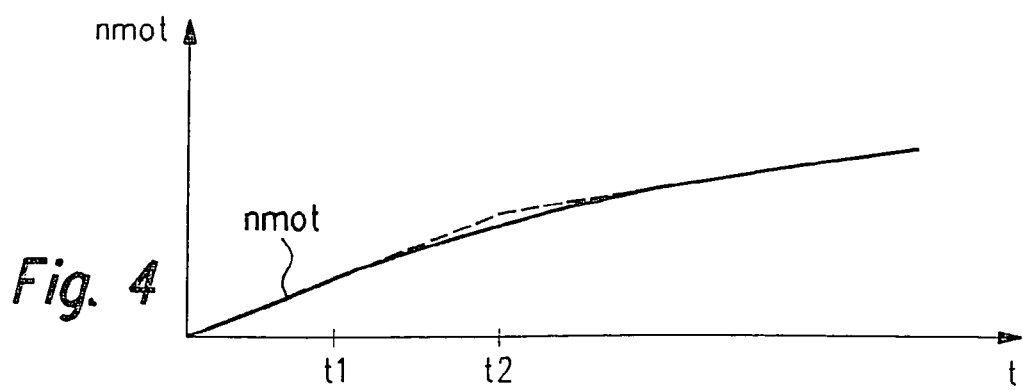
FIG. 4 is a diagram wherein an rpm of the engine of FIG. 1 is plotted as a function of time when the engine is operated in accordance with the method of FIG. 2.
Figure 5:
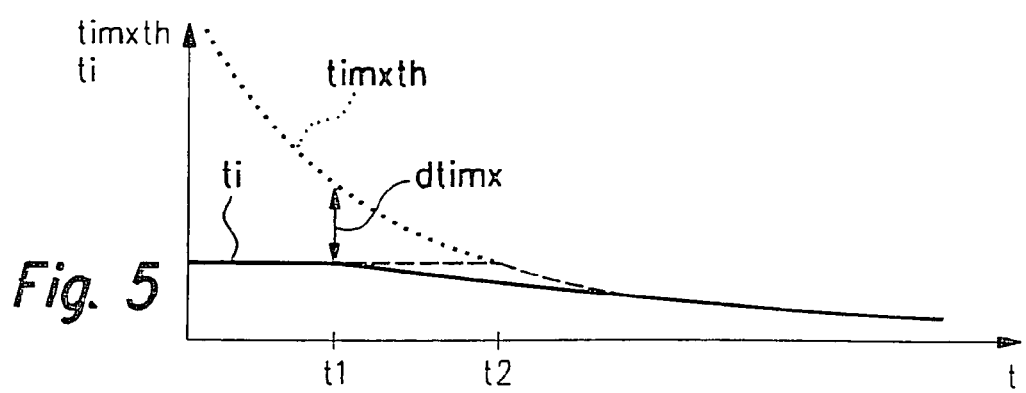
FIG. 5 is a diagram similar to FIG. 4 wherein a requested injection duration as well as a maximum possible injection duration are plotted as a function of time.
Figure 6:
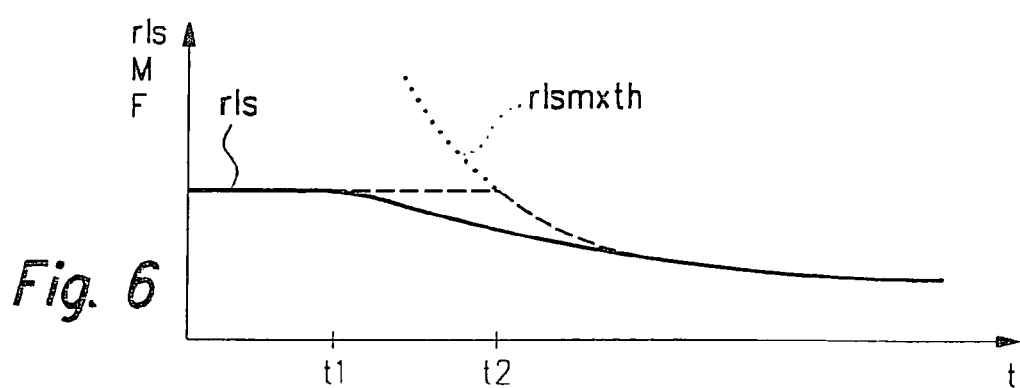
FIG. 6 is a diagram similar to FIG. 4 wherein a desired value for an air charge, a corresponding torque and a corresponding acceleration force are plotted; and, FIG. 7 is a diagram similar to FIG. 4 wherein a change of the torque per time (rate of change) and a change of the corresponding acceleration force per time are plotted as a function of time.

As shown in FIGS. 4 to 6, a sharp kink in the corresponding curves is avoided with the PID-control and in lieu thereof, a gentle transition is provided. Correspondingly, the curves for the torque M and the acceleration force F also have no sharp kinks so that, in FIG. 7, no corresponding jolt occurs. In lieu thereof, the acceleration change takes place relatively gently and the rate of change dM/dt or DF/dt is, with respect to magnitude, such that it does not exceed the perception threshold WS and, in this way, cannot at all be perceived by the occupants of the motor vehicle.

In an embodiment not shown, the prediction of exceeding the maximum possible injection duration in block 70 can take place also via a monitoring method, especially, a Luenberger monitoring method or a Kalman-Bucy filter. Furthermore, in lieu of an influencing of the desired value rls for the air charge in the combustion chamber 12 of the engine 10, also an influencing of the charging pressure in the intake manifold 14 can take place via a corresponding drive of the waste-gate 25. It is also possible that a desired value for the torque M, which is to be produced by the engine 10, is directly reduced. Basically, the influencing of all quantities, which are decisive for the combustion in the combustion chamber 12, can take place by means of characteristic lines.

In the above-described embodiment, the difference dtimx between requested injection duration ti and maximum possible injection duration timxth was used as a control quantity for the PID-controller in block 78. It is also possible, however, that the rate of change dM/dt of the torque M is used as an additional control quantity.

Furthermore, the application of the described method is not limited to internal combustion engines having intake manifold injection; rather, the method can also be used in internal combustion engines having gasoline-direct injection. There, the maximum possible injection duration, however, does not correspond to the "Dauerstrich" with which the injection valve is continuously open, rather, an injection window pregiven by the engine stroke. It is understood that the method can be used in the same way for gasoline and diesel engines. In diesel engines and in internal combustion engines having gasoline-direct injection (in stratified operation), the fuel mass must be used, however, as actuating quantity in lieu of the air charge.

The invention claimed is:

1. A method for operating an internal combustion engine wherein the fuel is injected via at least one injection valve and the injected fuel quantity is influenced by the injection duration, the method comprising the steps of:
    predicting whether a requested injection duration (ti) of the injection valve is greater than a maximum possible injection duration (timxth); and,
    when the prediction yields that such a case is imminent, influencing at least a quantity (rls), which is decisive for the combustion, to gently reduce the torque (M).

2. The method of claim 1, wherein the rate of change (dM/dt) of the torque (M) is less than a limit value.

3. The method of claim 2, comprising the further step of determining the limit value for the change (dM) of the torque (M) per time (dt) by a perception threshold (WS) of a user of the internal combustion engine.

4. The method of claim 1, comprising the further steps of:
    making the prediction via a comparison of the difference (dtimx) between maximum possible injection duration (timxth) and requested injection duration (ti) to a limit value (G1); and,
    comparing the rate of change (ddtimx/dt) of this difference to a limit value (G2).

5. The method of claim 4, wherein the limit value (G2) for the rate of change (ddtimx/dt) of the difference (dtimx) between maximum possible injection duration (timxth) and requested injection duration (ti) is dependent upon the magnitude of the difference (dtimx).

6. The method of claim 4, wherein the prediction takes place via a monitoring method, especially a Luenberger monitoring method or a Kalman-Bucy filter.

7. The method of claim 1, wherein the influencing includes the change of an air charge (rl) of a combustion chamber.

8. The method of claim 7, wherein the influencing includes the adjustment of the angle (wdk) of a throttle flap.

9. The method of claim 7, wherein the influencing includes the reduction of a charging pressure and/or an intake manifold pressure.

10. The method of claim 1, wherein the influencing includes an increase of the fuel pressure.

11. The method of claim 1, wherein the influencing includes a reduction of a desired torque.

12. The method of claim 1, wherein the influencing takes place by means of a characteristic line whose input quantity is the difference between requested and maximum possible injection durations.

13. The method of claim 1, wherein the influencing takes place by means of a controller whose control quantity is the difference (dtimx) between requested injection duration (timx) and maximum possible injection duration (timxth).

14. The method of claim 1, wherein the influencing takes place by means of a PD-controller or a PID-controller whose control quantity is the difference (dtimx) between requested injection duration (timx) and maximum possible injection duration (timxth).

15. The method of claim 13, wherein the rate of change of the torque is used as an additional control quantity.

16. A computer program on a tangible medium comprising a program suitable for carrying out a method for operating an internal combustion engine when executed on a computer, the engine having an injection valve with which fuel is injected and the injected fuel quantity is influenced by the injection duration, the method including the steps of:
predicting whether a requested injection duration (ti) of the injection valve is greater than a maximum possible injection duration (timxth); and,
when the prediction yields that such a case is imminent, influencing at least a quantity (rls), which is decisive for the combustion, to gently reduce the torque (M).

17. The computer program of claim 16, wherein the computer program is stored in a memory.

18. The computer program of claim 16, wherein the computer program is stored in a flash memory.

19. A control apparatus (open loop and/or closed loop) for operating an internal combustion engine including at least an injection valve for supplying fuel, the control apparatus comprising:
means for outputting a desired value (ti) for the injection duration of the injection valve;
means for predicting whether a requested injection duration (ti) of the injection valve becomes greater than a maximum possible injection duration (timxth); and,
means which, when the prediction yields that such a case is imminent, influences at least one quantity (rls), which is decisive for the combustion, in such a manner that the torque (M) is gently reduced.

20. The control apparatus of claim 18, wherein the apparatus is provided with a computer program.

21. An internal combustion engine comprising:
at least an injection valve for supplying fuel; and,
a control apparatus including:
means for outputting a desired value (ti) for the injection duration of the injection valve;
means for predicting whether a requested injection duration (ti) of the injection valve becomes greater than a maximum possible injection duration (timxth); and,
means which, when the prediction yields that such a case is imminent, influences at least one quantity (rls), which is decisive for the combustion, in such a manner that the torque (M) is gently reduced.

* * * * *

UNITED STATES PATENT AND TRADEMARK OFFICE
CERTIFICATE OF CORRECTION

PATENT NO. : 7,051,703 B2  Page 1 of 1
APPLICATION NO. : 10/474695
DATED : May 30, 2006
INVENTOR(S) : Thomas Wenzler It is certified that error appears in the above-identified patent and that said Letters Patent is hereby corrected as shown below:

In Title Page:
Under (57) ABSTRACT, Line 2: delete "injection" (second occurrence) and substitute -- injected -- therefor.
Under (57) ABSTRACT, Line 7: delete "become greater that" and substitute -- becomes greater than -- therefor.
Under (57) ABSTRACT, Line 8: insert -- such -- after "that".
Under (57) ABSTRACT, Line 10: delete "on influence" and substitute -- so influenced -- therefor.
Under (57) ABSTRACT, Line 11: delete "reduce." and substitute -- reduced. -- therefor.

In column 12:
Line 13: delete "claim 18," and substitute -- claim 19, -- therefor.

Signed and Sealed this

Nineteenth Day of September, 2006

JON W. DUDAS
*Director of the United States Patent and Trademark Office*